Dec. 13, 1932.     P. LA F. MAGILL     1,890,881
PROCESS FOR TREATING HYDROCARBONS
Filed March 23, 1929
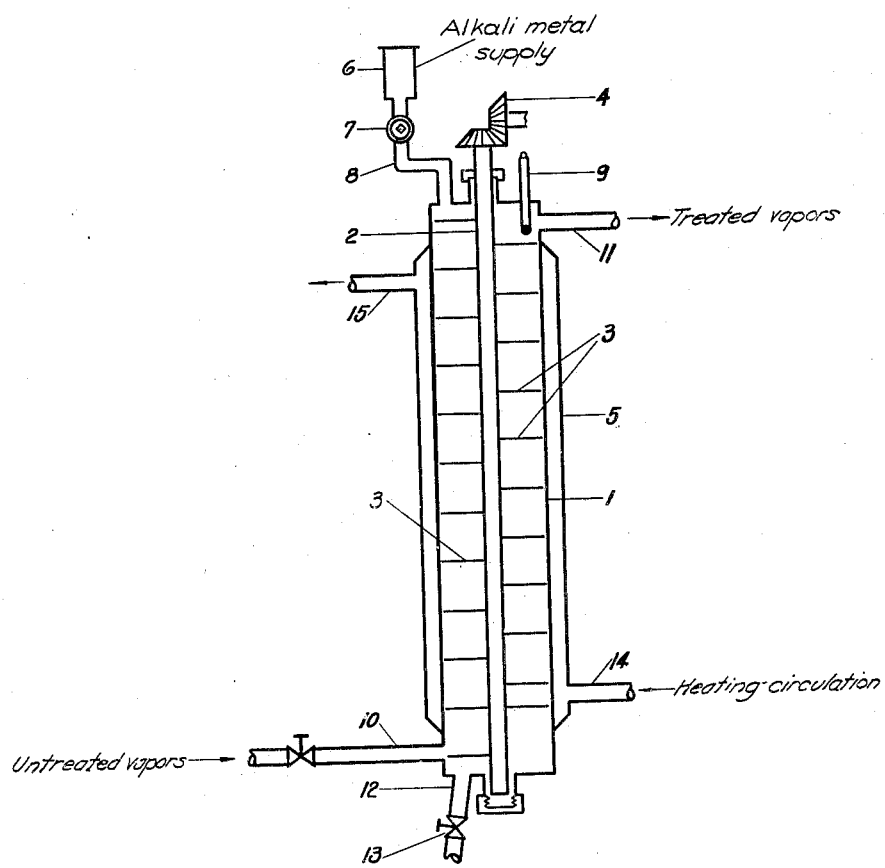
INVENTOR
Paul La Fronc Magill,
BY
ATTORNEY Patented Dec. 13, 1932

1,890,881

UNITED STATES PATENT OFFICE

PAUL LA FRONE MAGILL, OF NIAGARA FALLS, NEW YORK, ASSIGNOR, BY MESNE ASSIGNMENTS, TO THE ROESSLER & HASSLACHER CHEMICAL COMPANY, A CORPORATION OF DELAWARE

PROCESS FOR TREATING HYDROCARBONS

Application filed March 23, 1929. Serial No. 349,312.

This invention relates to the treatment of hydrocarbons. These hydrocarbons may be obtained from any source, such as the distillation of crude petroleum, cracking of heavy hydrocarbons, hydrogenation of coal, distillation or extraction of oil shale, casing head gasoline, etc. My invention is also applicable to the individual hydrocarbons as well as to mixtures.

These untreated products are usually undesirable for use because of the presence of substances, such as certain sulfur compounds and unstable hydrocarbons. Thus in gasoline for motor use these undesirables must be reduced to render the product stable and saleable. In this specification my invention will be particularly described with reference to what is commonly known as gasoline, but I do not wish to be limited thereto since my invention is generally applicable to the treatment of many hydrocarbons.

The treating of crude gasoline vapors with alkali metal usually results in the formation of certain by-products which may be polymers of unsaturated compounds in the gasoline or may be compounds of the treating agent with certain constituents of the gasoline, or both. These by-products which are herein called "polymer" are generally solid or semi-solid and if allowed to accumulate in the ordinary treating vessel the mixture becomes difficult to handle and the contact of the vapors with the alkali metal is reduced to such an extent as to render the treatment very difficult and unsatisfactory. In many cases the treating vessel becomes choked with these substances so that little or no gasoline vapors can be passed through it and the quality of the product becomes poor. For economic reasons it is necessary to recover the unreacted alkali metal from its mixture with the treatment by-products.

The object of this invention is to avoid the above difficulties caused by the accumulation of polymer by using the solid or semi-solid polymer itself as a support or dispersing medium for alkali metal in the treatment of hydrocarbon vapors.

A further object is to provide a process for treating hydrocarbon vapors wherein alkali metal is introduced as needed into one end of a treating vessel, passed slowly through the vessel, suspended in finely divided form with polymer, counter current to the hydrocarbon vapors, and is substantially completely reacted before it reaches the discharge end of the vessel, thereby permitting the discharge of polymer with so little alkali metal therein that no recovery of the metal is necessary. Thus there is provided an elongated semifluid or semi-solid medium wherein the alkali metal concentration varies from a maximum at the outlet end for the treated vapors to a minimum at the end at which the polymer or medium is discharged.

If hydrocarbon vapors to be treated are passed through alkali metal, say sodium, in a treating vessel provided with a suitable agitator and maintained at a temperature such that practically no unchanged constituents of the hydrocarbon vapors undergoing treatment will condense then polymers will accumulate but the constant agitation will keep the sodium well dispersed throughout the mass so that the vapors will have adequate contact for treatment. In this way the semisolid mass of polymer serves to support and to distribute evenly the small particles of sodium. The agitation serves to prevent channelling and consequent inadequate contact and also tends to keep exposed to the vapors a relatively large surface of alkali metal. There will be substantially no settling out of sodium if agitation is stopped unless the polymer-sodium mixture is more or less diluted say with condensed higher boiling fractions of the gasoline treated.

The drawing illustrates one apparatus in which my invention can be practiced; however, I do not wish to be limited to the particular form shown.

1 is a treating vessel or reactor shown in a vertical position. It is equipped with an agitator consisting of a longitudinal shaft 2, bearing radial arms 3 and driven through the gears 4. The reactor is equipped also with a heating means, in this case a jacket 5, through which a hot liquid, for example oil, can be circulated by any well known method. 6 is a feed vessel for molten alkali metal;

the latter being introduced through valve 7 and pipe 8 into the top of the reactor. The feed vessel may be supplied with a heating means, not shown, to keep the metal in a molten condition. 9 is a thermometer for indicating the temperature in the reactor near the exit for the treated hydrocarbon vapors.

Hydrocarbon vapors to be treated are introduced into the reactor by way of the valved pipe 10. They pass upward through the treating medium and leave the reactor by pipe 11. The pipe 12 and valve 13 shown at the bottom of the reactor are used for discharging polymer from the reactor. The hot liquid used for supplying heat to the reactor enters the jacket at 14 and leaves at 15.

Operation may be started in several ways and I do not limit myself in this respect, but I prefer one of the two following methods. (1) The reactor is charged with polymer if available and after starting the agitator sodium is added at the top in the required amount. (2) If no polymer is available the reactor is charged with a convenient amount of molten alkali metal. The reactor by means of the heating jacket is brought to the desired temperature and the hydrocarbon vapors to be treated are then admitted at 10. The treated hydrocarbon vapors leaving the reactor are recovered according to standard practice.

If the reactor is first charged according to the second method, polymer will accumulate as hydrocarbon vapors are treated. After a time this polymer will be sufficient so that the sodium will be distributed in it to function in accordance with my invention. The preferred method of operation thereafter consists in discharging the polymer continuously or discontinuously at the end of the reactor at which the vapors to be treated enter. With proper rate of treatment and agitation the polymer so discharged will contain insignificant amounts of unreacted alkali metal. Fresh sodium is added near the exit for the treated hydrocarbon vapors as needed either continuously or discontinuously. The travel of alkali metal is therefore substantially in counterflow to the travel of the vapors undergoing treatment and so proportioned that it is practically completely consumed before the polymer mass is discharged. In operation the agitator serves to keep the sodium distributed in the polymer which steadily accumulates. The agitator should preferably agitate the mass in a direction substantially at right angles to the flow of vapors.

*Example.*—An apparatus, as shown in the drawing, approximately 18 inches long and 2 inches in diameter, was charged with 175 g. of sodium. 126.23 liters of raw cracked gasoline was vaporized and passed approximately continuously into the reactor at an average temperature of 200° C. The jacket temperature was maintained at such point that the treated vapors left the reactor at an average temperature of 190° C. The agitator revolved at a speed of about 13 R. P. M. After running for about 59 hours 20 g. of sodium was fed into the reactor. At the end of 62 hours the total amount of sodium left unreacted in the reaction mixture by analysis was 15.1 g. so that the total consumption of sodium had been 179.9 g. corresponding to a sodium consumption of about 0.57 lb. per barrel of recovered gasoline. The recovered treated gasoline, 120.15 liters, represented a recovery of over 95%.

The polymer mixture removed from the reactor was a semi-solid, greasy mixture substantially free of gasoline. Its weight, including 15.1 grams of sodium, was 559 grams. There was no tendency for the particles of sodium to segregate out of the mixture on standing.

The raw cracked gasoline came from a Pennsylvania charging stock and contained 0.025% sulfur, 5.9% unsaturateds, 16.2% aromatic hydrocarbons and 77.9% naphthenes and paraffines. The distillation range was such that, 10% came over between 108 and 174° F., 20% came over below 218° F., 30% came over below 253° F., 40% came over below 283° F., 50% came over below 310° F., 60% came over below 333° F., 70% came over below 352° F., 80% came over below 371° F., 90% came over below 393° F., end came over below 418° F.

The treated gasoline gave negative doctor and copper strip corrosion tests and was water white in color; that is, its color number on the Saybolt scale was 30. Kept in the dark for 69 days in tinned cans the color dropped to about 26. Kept in the dark for 69 days in glass bottles the color was 28. The distillation range was changed very little.

In order to avoid ambiguity and to avoid a multiplicity of claims the following definitions of the terms used in the claims are here given.

The term "alkali metal" covers these metals, i. e., sodium, potassium, etc., singly or in various combinations or mixtures with each other or with other metals such as calcium, magnesium, mercury, lead, tin, etc., in alloys or compositions which are liquid at the temperature of the treatment. The term "by-products" covers all of the substances that are formed in the treating medium and that are not removed with the treated hydrocarbon vapors leaving the treating vessel. The term "hydrocarbons" stands for mineral oils, gasolines and any other hydrocarbon materials that may be improved by such treatment as herein described.

I claim:
1. Process comprising passing hydrocarbon vapors, at a temperature above that at which substantial amounts of vapors con- dense, through a mechanically agitated treating mixture comprising finely divided alkali metal intimately dispersed in a semi-solid mass of by-products produced by the reaction of said alkali metal on hydrocarbons.

2. Process comprising passing hydrocarbon vapors through a mechanically agitated treating mixture comprising relatively small amounts of sodium intimately dispersed in a semi-solid mass of by-products produced by the action of said sodium on hydrocarbon vapors, adding sodium to said mixture and discharging by-products at a point where they are substantially free from sodium.

3. Process comprising passing hydrocarbon vapors counter-current to a mechanically agitated treating mixture comprising finely divided alkali metal intimately dispersed in a semi-solid mass of by-products produced by the action of alkali metal on hydrocarbon vapors.

4. Process comprising passing hydrocarbon vapors counter-current through a mechanically agitated treating mixture comprising a finely divided treating agent uniformly dispersed in a semi-solid mass of by-products produced by the action of said treating agent on hydrocarbon vapors, adding treating agent to said mixture near the exit means for treated vapors and discharging treatment by-products substantially free from active treating agent near the inlet means for untreated vapors.

5. Process comprising providing a mass of semi-solid hydrocarbon polymer, intimately distributing relatively small amounts of finely divided sodium throughout said mass, passing hydrocarbon vapors to be purified through said mass while mechanically stirring the mass to facilitate contact between the vapors and said sodium and while maintaining the mass at a temperature above that at which substantial amounts of said vapors condense.

Signed at Niagara Falls, in the county of Niagara and State of New York, this 20th day of March, A. D. 1929.

PAUL LA FRONE MAGILL.